(12) United States Patent
Miehl et al.

(10) Patent No.: US 10,749,999 B2
(45) Date of Patent: Aug. 18, 2020

(54) RADIO CONTROL FOR A PORTABLE COMMUNICATION DEVICE

(71) Applicant: MOTOROLA SOLUTIONS, INC, Chicago, IL (US)

(72) Inventors: Andrew P. Miehl, Boca Raton, FL (US); Jody H. Akens, Weston, FL (US); Jin Siang Chew, Coral Springs, FL (US); William Robertson, Pompano Beach, FL (US); Anthony M Kakiel, Coral Sprins, FL (US); Peter Gilmore, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 27 days.

(21) Appl. No.: 16/228,394

(22) Filed: Dec. 20, 2018

(65) Prior Publication Data
US 2020/0204667 A1   Jun. 25, 2020

(51) Int. Cl.
| | |
|---|---|
| *H04M 1/02* | (2006.01) |
| *G06F 3/01* | (2006.01) |
| *H01H 3/32* | (2006.01) |
| *H01H 3/12* | (2006.01) |
| *H01H 3/04* | (2006.01) |
| *H01H 19/14* | (2006.01) |
| *H01H 3/02* | (2006.01) |

(52) U.S. Cl.
CPC .......... *H04M 1/0279* (2013.01); *G06F 3/016* (2013.01); *H01H 3/04* (2013.01); *H01H 3/12* (2013.01); *H01H 3/32* (2013.01); *H01H 19/14* (2013.01); *H01H 2003/028* (2013.01)

(58) Field of Classification Search
CPC ......... H04M 1/0279; H01H 3/12; H01H 3/32; H01H 19/14; H01H 3/04; H01H 2003/028; G06F 3/016

USPC ................. 200/329–332, 337, 338, 547, 551
See application file for complete search history.

(56) References Cited

U.S. PATENT DOCUMENTS

| | | | |
|---|---|---|---|
| 6,491,137 B2 | 12/2002 | Lumpkin et al. | |
| 6,538,539 B1 * | 3/2003 | Lu | H01H 3/46 200/331 |

FOREIGN PATENT DOCUMENTS

| | | |
|---|---|---|
| EP | 1835518 A1 | 9/2007 |
| GB | 2515008 A | 12/2014 |
| GB | 2515474 A | 12/2014 |

OTHER PUBLICATIONS

The International Search Report and the Written Opinion corresponding patent application No. PCT/US2019/064931 filed Dec. 6, 2019, dated Dec. 3, 2019, all pages.

* cited by examiner

*Primary Examiner* — Edwin A. Leon
*Assistant Examiner* — Lheiren Mae A Caroc
(74) *Attorney, Agent, or Firm* — Barbara R. Doutre

(57) ABSTRACT

A control switch (110) is provided to facilitate a primary user interface for a control top surface (106) of a non-orthogonal control top (102) of a portable communication device (100). The control switch (110) comprises a thumb button actuator (112), a rotary lever (220) having a lever arm (222) extending therefrom, a transfer arm (202) coupled between the thumb button actuator and the lever arm of the rotary lever, and an electrical rotary switch (204) with a switch shaft (224) providing a primary axis of orthogonal rotation. Actuation of the thumb button actuator (112) results in linear, non-orthogonal motion of the transfer arm (202) being translated into rotary motion of the switch shaft (224) about the primary axis of orthogonal rotation (205).

22 Claims, 8 Drawing Sheets

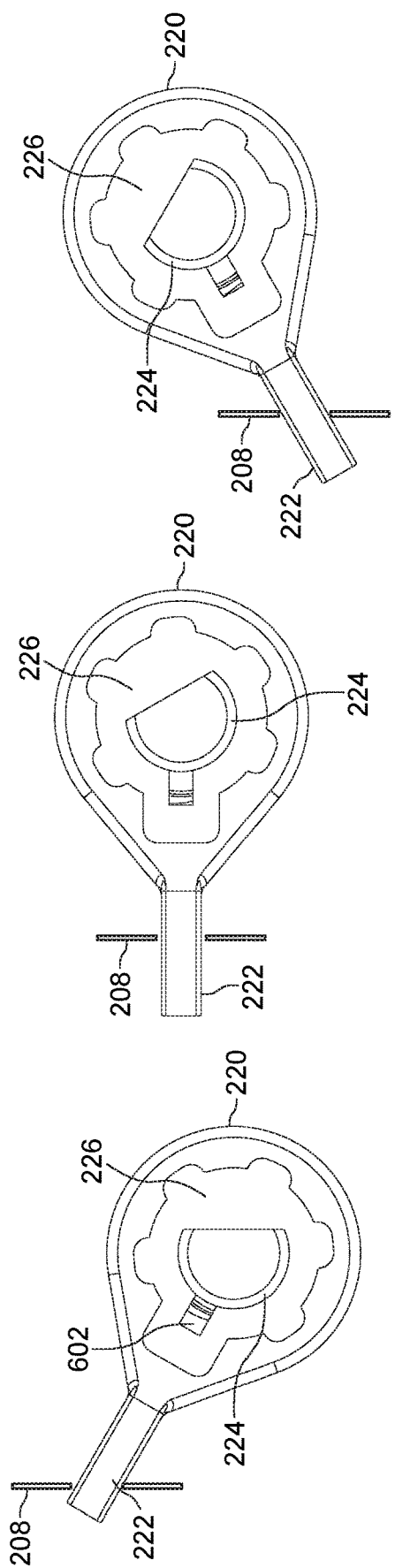
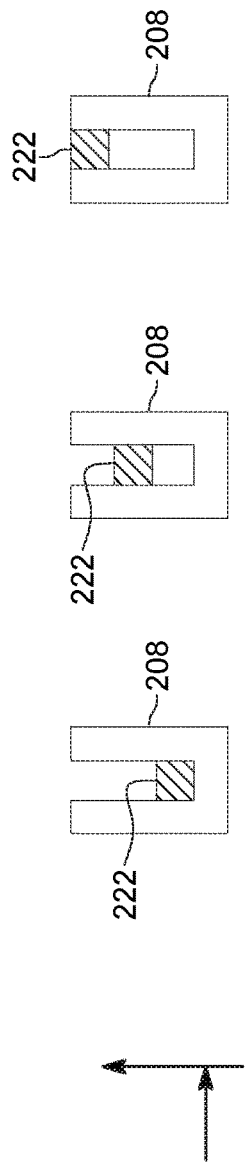
FIG. 6C  FIG. 6B  FIG. 6A
FIG. 7C  FIG. 7B  FIG. 7A

RADIO CONTROL FOR A PORTABLE COMMUNICATION DEVICE

FIELD OF THE DISCLOSURE

The present invention relates generally to control switches, and more particularly to a control switch for a portable communication device.

BACKGROUND

Communication devices, and more particularly portable radio communication devices, often provide a plurality of user interface switches for controlling operational functions such as power on/off, volume control, channel selection, and zone change to name a few. For devices being utilized by public safety personnel, it important to provide an ergonomic form factor well suited to first responders working in fire rescue, paramedic operations, and/or law enforcement. Crowding of external physical user interface controls should be avoided, as first responders must often operate radios without visual cues. Thus, it is desirable to provide external user interface controls with some form of tactile feedback to facilitate operation within a limited amount of space. The tactile feedback is particularly important for a portable radio communication device operating under harsh environmental conditions and gloved usage. For example, in public safety environments involving fire rescue, paramedic and/or law enforcement, a handheld radio may be operated in areas subjected to dust, water, and debris, and/or other environmental or physical conditions that necessitate a simple, easy to interpret user interface. Avoiding inadvertent actuation of a control switch is also very important. Tolerance sensitivity, ruggedness, excessive wear, stack-up constraints, ease of manufacturability and switch retention are also factors to be taken into consideration in the design of a radio control interface. There is also a need to bridge internal and external packaging constraints associated with portable communication devices.

Accordingly, it would be beneficial to have an improved radio control switch for a portable communication device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 6A, 6B, 6C show a top view of the rotary lever with lever arm being rotated in accordance with some embodiments.

FIGS. 7A, 7B, 7C show a side view of the slot end of the transfer arm with lever inserted therein as the switch is being rotated in accordance with some embodiments.

Figure 1:
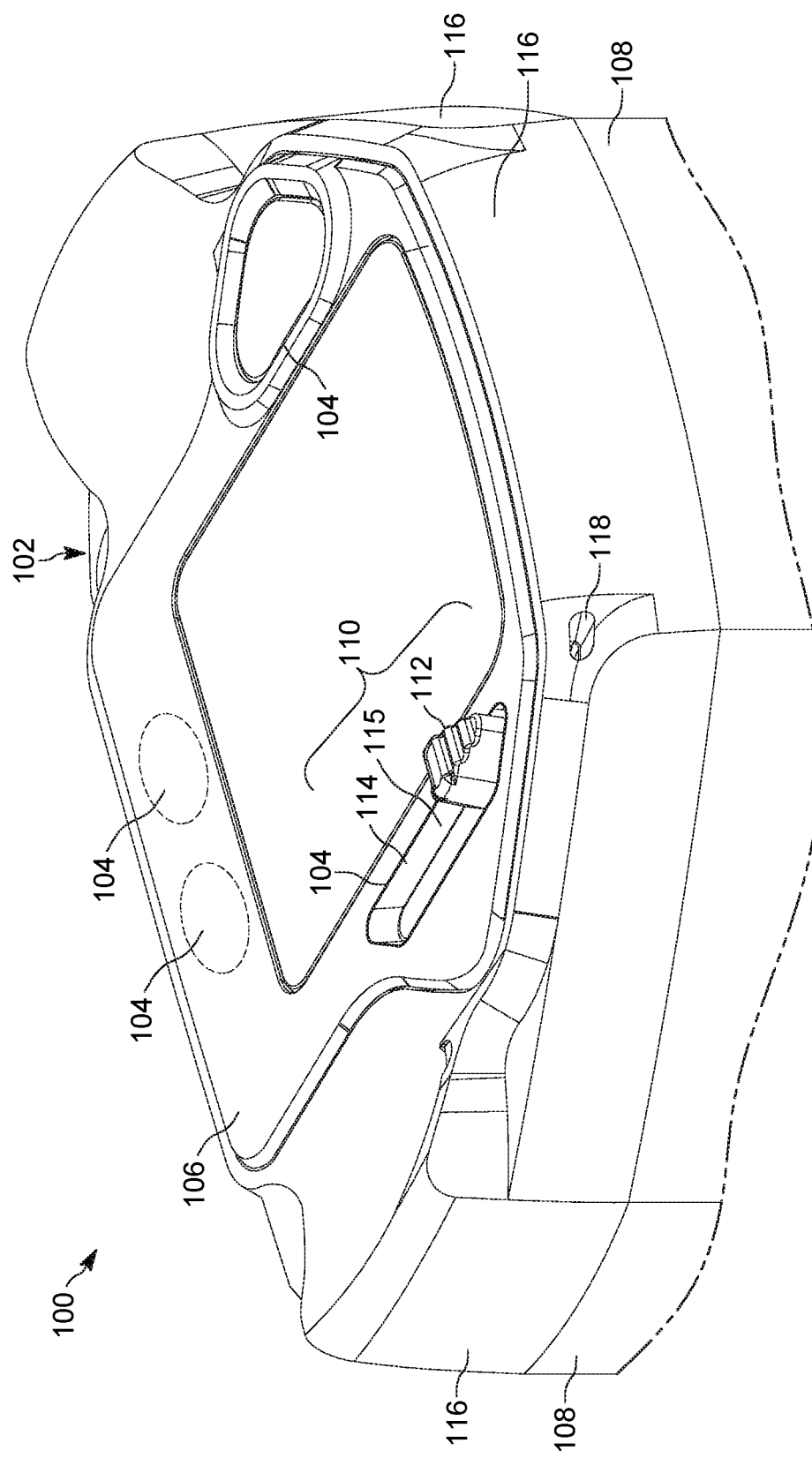
FIG. 1 is a partial view of a portable communication device with a radio control top having a radio control switch formed and operating in accordance with some embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein an improved control switch for a portable communication device which couples a linear actuator operating in a non-orthogonal plane to a rotary switch operating in an orthogonal plane. The control switch to be described herein comprises a thumb button actuator, a transfer arm, a rotary lever having a lever arm extending therefrom, and an electrical rotary switch with a shaft, the shaft being rotatable by the rotary lever via linear, non-orthogonal motion transferred from the transfer arm in response to actuation of the thumb button actuator. While the embodiments described herein have been described in terms of a zone selection control switch, it is to be appreciated that other control functions may take advantage of the improvements provided by the control switch.

FIG. 1 is a partial view of a portable communication device 100 with a control top formed and operating in accordance with some embodiments. The portable communication device 100 is preferably a portable radio communication device featuring a radio control top 102 providing a primary user interface surface for accessing a plurality of user interface controls 104 situated upon a non-orthogonal control top surface 106, a few of such controls are shown generally in phantom lines and others in solid lines. The non-orthogonal control top surface 106 facilitates user access to a variety of different radio user interface features. Such user interface features may comprise, for example, volume control, power on/off, channel selection, display, zone selection, and/or an emergency button to name a few. While the non-orthogonal control top surface 106 facilitates user identification of radio controls distributed thereon, such a configuration also presents challenges in terms of space constraints and interconnection of radio control assemblies embodied therein. Particularly challenging is that at least one of the user interface controls 104 operates by linear motion, along the non-orthogonal plane of control top 102, wherein the linear, non-orthogonal motion is translated to rotary motion for an internal rotary switch (shown in other views) having a primary axis of rotation in an orthogonal plane.

In accordance with the embodiments, at least one of the plurality of user interface controls 104 comprises a radio control switch 110 formed and operating in accordance with the embodiments. Radio control switch 110 is operated by a thumb button actuator 112 which provides a slide switch user interface. The thumb button actuator 112 slides within a housing slot 114 formed in the top control top 102. Radio control switch 110 preferably operates as a zone controller for selection between a plurality of radio zones marked as A, B, C, however it is understood that the radio control switch 110 could be applied to other radio functions. The embodiments described herein are directed towards the assembly and operation of radio control switch 110.

In accordance with further embodiments, one or more ports 118 may be provided in the control top 102. The one or more ports 118 may be configured as a discharge port for any debris that might find its way into the mechanism by providing an opening to the exterior of the control top 102 of portable communication device 100. The one or more ports 118 allow debris to leave, but not enter. The embodiments described herein are further directed towards the assembly and operation of radio control switch 110 which facilitates the egress of debris.

Figure 2:
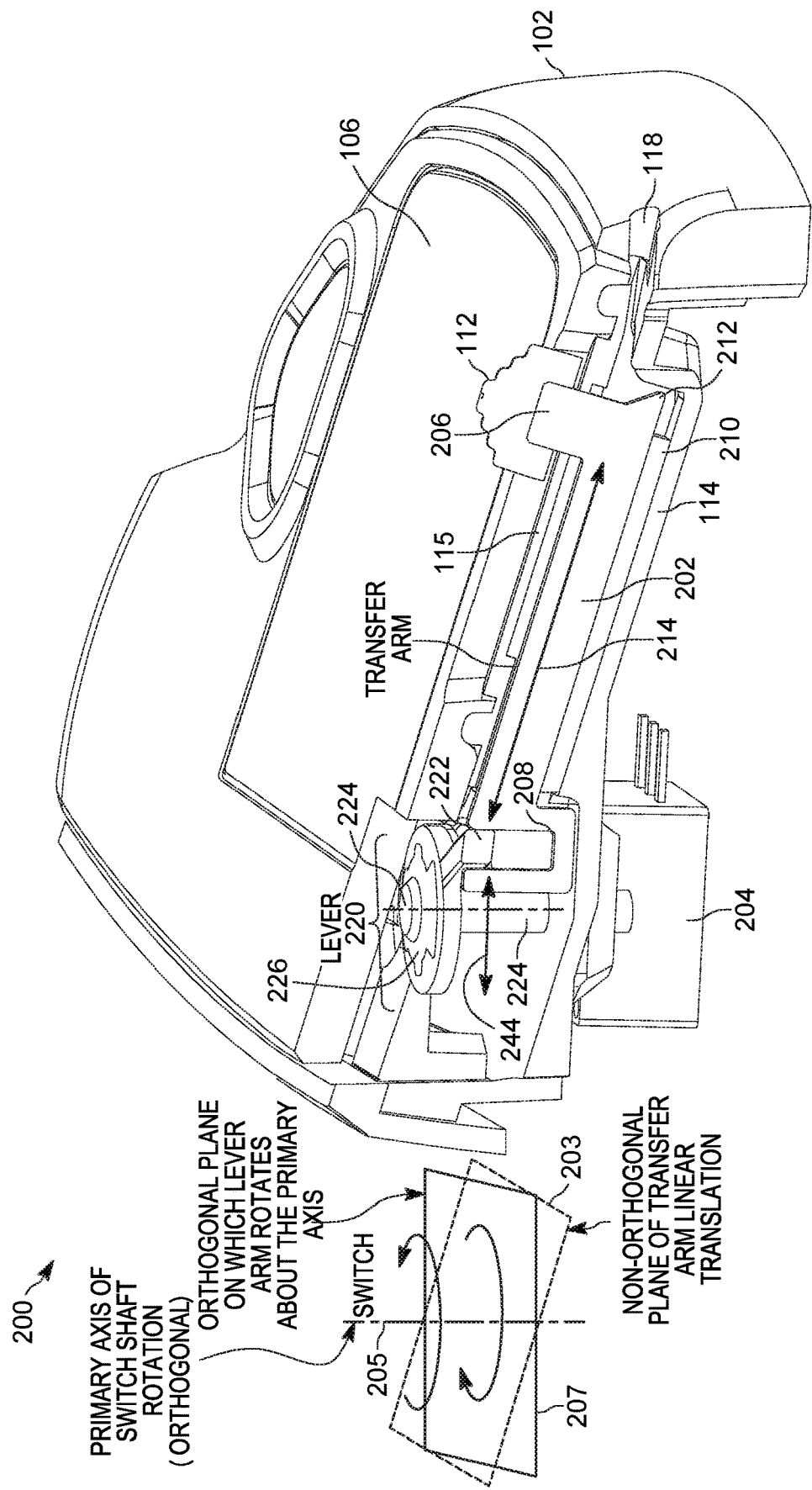
FIG. 2 is a first partial cut-away view of the radio control top with radio control switch in accordance with some embodiments.

FIG. 2 is a first partial cut-away view of the radio control top 102 with radio control switch 110 in accordance with some embodiments. In accordance with some embodiments, the radio control switch 110 comprises thumb button actuator 112 and a transfer arm 202 coupled thereto for actuating an electrical rotary switch 204 located within the control top 102. The electrical rotary switch 204 comprises a rotary lever 220, a lever arm 222, and a switch shaft 224 extending therefrom, also referred to as shaft 224. The electrical rotary switch 204 is a software programmable switch that electrically couples to a controller (not shown), such as for radio zone selection or other radio control function. Motion of the transfer arm 202 and shaft 224 will be described in terms of different planes and axis of rotation, shown as a non-orthogonal plane 203, an orthogonal primary axis of rotation 205, and an orthogonal plane 207.

In accordance with the embodiments, the transfer arm 202 is formed as a very thin (blade-like), unitary metal piece part having a connection tab 206 formed at a first end of the transfer arm, and a retention slot 208 formed at a second end of the transfer arm. In accordance with the embodiments, the shaft 224 is rotatable by the orthogonally-oriented rotary lever 220 via linear, non-orthogonal motion 214 transferred to the lever arm 222 by the non-orthogonal transfer arm 202 in response to actuation of the thumb button actuator 112.

In accordance with the embodiments, the first tab end 206 of the transfer arm 202 is coupled to the thumb button actuator 112 and the second slot end 208 of the transfer arm 202 is engaged to the lever arm 222. The transfer arm 202 provides non-orthogonal, linear motion 214 with respect to the primary orthogonal axis of rotation 205 associated with the shaft 224, in response to a sliding actuation of the thumb button actuator 112 along the non-orthogonal control top 102.

The transfer arm 202 is preferably inserted into a track 210 accessible through the control top surface 106 of the control top 102. The track 210 and the transfer arm 202 inserted therein, parallel a non-orthogonal plane 203 of the control top 102. Once inserted into the track 210, the first and second ends of the transfer arm 202 (tab end 206 and slot end 208) extend beyond the first and second ends of the track. The tab end 206 of transfer arm 202 protrudes externally out of the track 210 and control top 102 providing a connection for capping by the thumb button actuator 112 which is accessible to a user as a user interface. The tab end 206 of transfer arm 202 slides above the track 210 in response to sliding thumb button actuator 112. The slot end 208 of transfer arm 202 is configured to prevent entry into the track 210. The retention slot 208 of transfer arm 202 remains internal to the control top 102 for capturing the lever arm 222 of the rotary lever 220. The lever arm 222 sits within the slot 208 of the transfer arm 202. The retention slot end 208 of transfer arm 202 provides two-dimensional tolerance sensitivity by providing sufficient space for an arm end of the lever arm 222 to be articulated within the slot. When positioned for operation within the overall system, movement of the actuator button 112 on the connection tab 206 of transfer arm 202 moves along the non-orthogonal plane 203 which rotates the lever arm 222 horizontally 214, about the primary axis of rotation 205, which rotates the shaft 224 and actuates the rotary switch 204 in the orthogonal plane 207.

In operation, a user pushes or pulls the thumb button actuator 112 along the external non-orthogonal control top plane 203 which transfers a force to the transfer arm connection tab 206, which in turn slides the transfer arm 202 linearly within track 210 along the parallel internal non-orthogonal plane 203. Linear sliding of transfer arm 202 along the track 210 causes the lever arm 222 of rotary lever 220 to rotate. The rotation of the lever arm 222 is in a single plane, that being the horizontal rotations about the primary axis of rotation. The rotary lever 220 is tightly coupled to switch shaft 224 of electrical rotary switch 204. Rotation of the rotary lever 220, via lever arm 222, causes rotation of the shaft 224 to switch the electrical rotary switch 204.

The transfer arm 202 is preferably formed of thin sheet metal allowing the member to operate as a rigid actuator while presenting a minimal external profile which ultimately minimizes exposure of the assembly to debris. If any debris does manage to get into the track 210, the leading edge of the transfer arm 202 may be provisioned with a plow feature 212 which can be used to push debris out of the track 210 at front port 118, which operates as a discharge port for debris. The plow feature 212 of transfer arm 202 is formed of a blade-like geometry leveraged to achieve a corresponding razor-thin penetration to the outside.

The retention slot 208 of transfer arm 202 provide a vertical gap with sufficient space to compensate for intended vertical component of the non-orthogonal misalignment which occurs in response to the movement of the transfer arm 206 in the non-normal plane as it manipulates the lever arm 222 of rotary lever 220. The vertical position of the lever arm 222 within the retention slot 208 changes due to the transfer arm 202 being out of plane. As will be shown in greater detail in later figures, the transfer arm retention slot 208 is horizontally wider than lever arm 222 to allow for articulation (cam operation) of the lever arm at a plurality of different angles of rotation in the orthogonal plane.

The rotary lever 220 can be fabricated of metal with a plastic insert 226. The plastic insert 226 is made of a sufficiently hard plastic with suitable compliancy to couple tightly to the shaft 224 while also providing the ruggedness to control rotation of the shaft. The shaft 224 is preferably a metal D-shaped shaft. The rigidity of the transfer arm 202, the rotary lever 220, and the hard plastic insert all contribute to the ruggedness of the overall mechanism as well as to improving tactility for the user interface. Tactility from rotary switch 204 is transferred along shaft 224 to rotary lever 220 and lever arm 222 through to the transfer arm connection tab 206 and into the thumb button actuator 112.

Accordingly, the assembly provides a mechanism where the transfer arm 202 transmits linear motion 214 along a non-orthogonal plane 203 to rotary motion about a primary axis 205 of the electrical rotary switch 204 in an orthogonal plane 207. Pushing or pulling of the thumb button actuator 112 causes linear movement of transfer arm 202 in the non-orthogonal plane 203 which is transmitted into rotary motion via the rotary lever 220 which rotates the shaft 224 of the electrical rotary switch 204.

Figure 3:
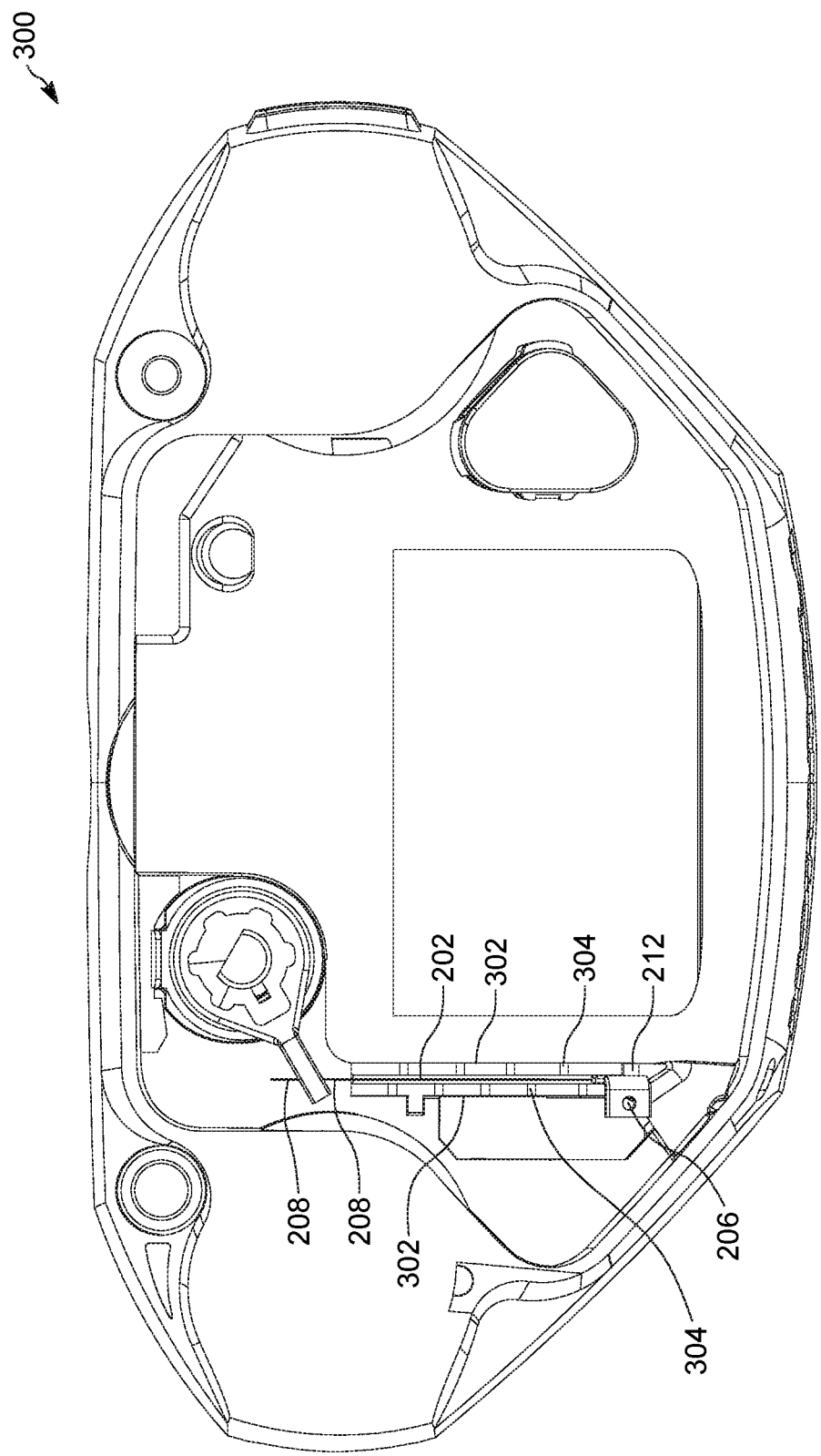
FIG. 3 is a second partial cut-away view of the radio control top with radio control switch in accordance with some embodiments.

FIG. 3 is a second partial cut-away view 300 of the radio control top with radio control switch in accordance with some embodiments. View 300 looks upon a top cut-away portion of the radio control top 102. In accordance with the embodiments, the track 210 is formed of a single piece part of plastic material having a low coefficient of friction and with sufficient compliance to allow the rigid, transfer arm 202 to slide easily. Track 210 may comprise track side walls 302 configured with castellations 304, formed of opposed facing notches in the walls, to provide mechanical activation which pumps trapped debris out of the mechanism.

Figure 4:
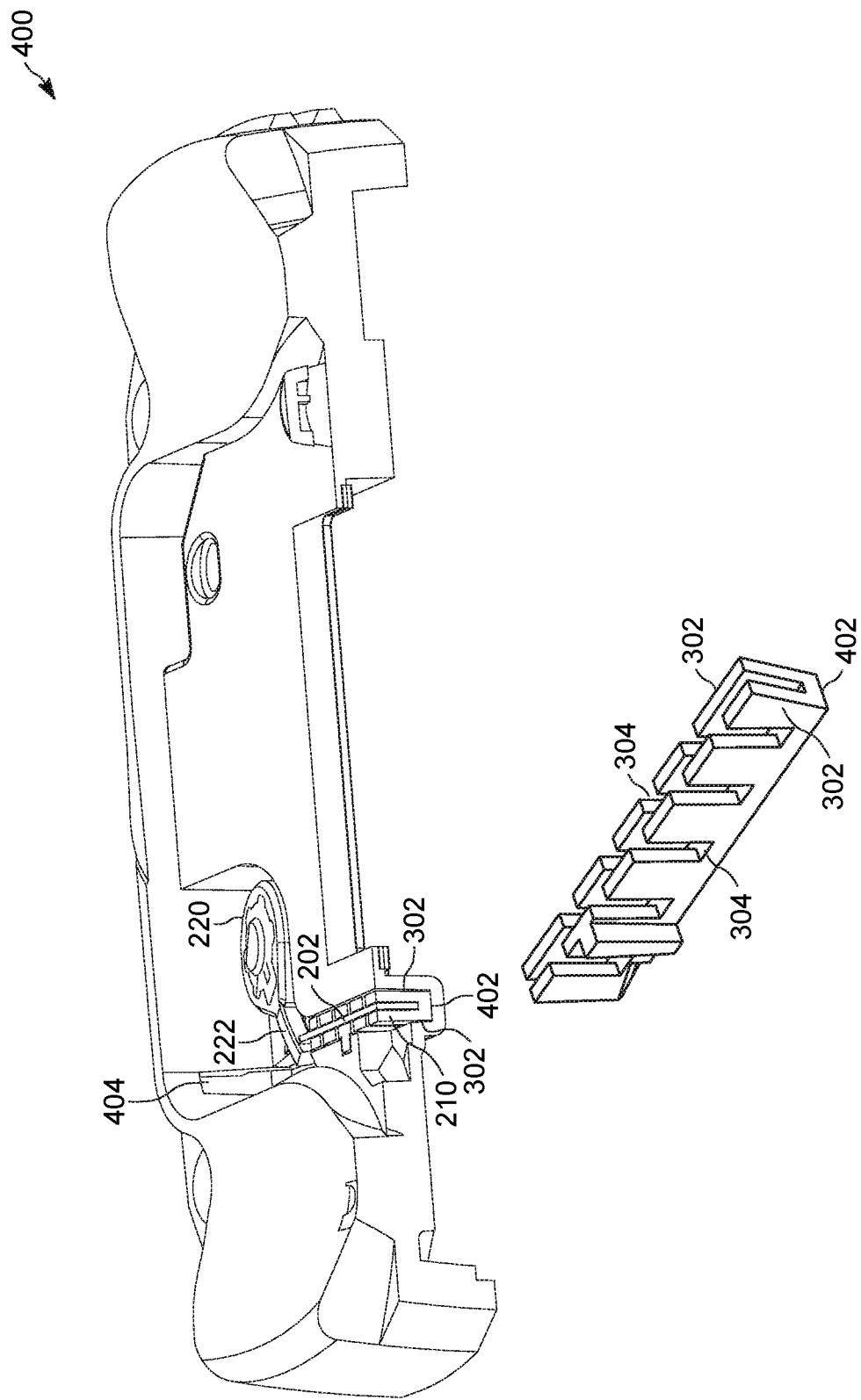
FIG. 4 is a third partial cut-away view of the radio control top with radio control switch in accordance with some embodiments.

FIG. 4 is a third cross-sectional cut-away view 400 of the radio control switch in accordance with some embodiments. This view shows the track 210 aligned to the non-orthogonal plane, formed of a single plastic material piece part, with rigid, transfer arm 202 inserted therein. The use of a separate piece part for the track 210 advantageously facilitates the compliance and low friction desirable for ease of movement of the arm. Track 210 may also be configured with a bottom wall portion 402 that flexibly connects the track side walls 302, allowing the track side walls to fold upwards and fit tightly against the thin, linear, non-planar transfer arm 202, while still enabling the arm to slide. This use of an independent piece part providing the track 210 with foldable sides advantageously allows for the thinnest possible transfer arm to be used. And for embodiments in which castellations may be implemented as part of the track 210, the castellated piece part advantageously facilitates the ability to reject debris.

This partial cut-away view 400 also shows another access port, referred to as a back access port 404, which can be used as a port for packing the mechanism cavity with grease. For embodiments, in which the mechanism is not packed with grease, the back access port 404 advantageously provides a discharge port for debris that might find its way into the mechanism by providing an opening to the exterior of the portable communication device which allows solid particles to leave, but not enter. Rotation of the lever arm 222 of rotary lever 220 by transfer arm 202 can push debris out of the back access port 404.

The use of access ports within the control top 102, whether aligned with the lever arm 222 (as was shown in FIG. 4) and/or aligned with the thumb button actuator 112 (as was shown in FIG. 1) allows for dust and debris that may have entered into the mechanism to be discharged, without allowing dust and debris to enter. Any entry of water from the top, around thumb button actuator 112, will exit at port 118.

Figure 5:
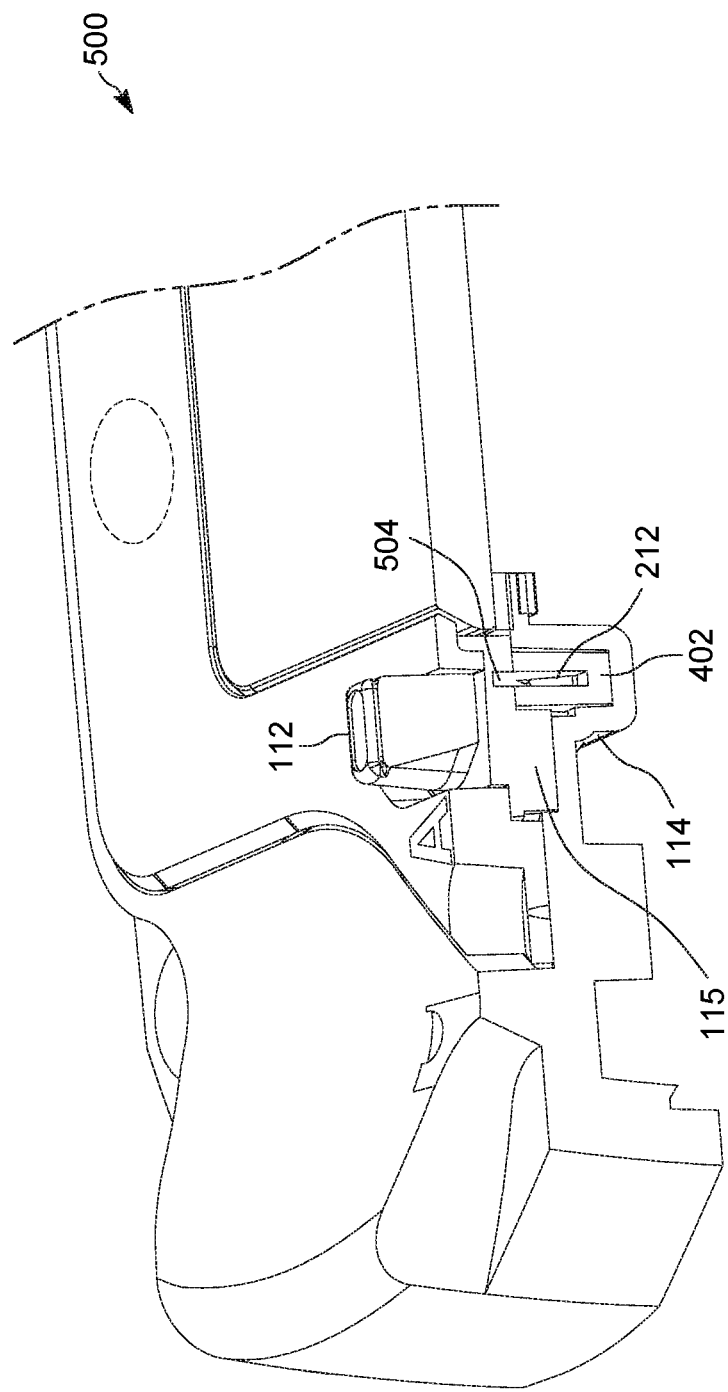
FIG. 5 is a fourth partial cut-away view of the radio control top with radio control switch in accordance with some embodiments.
Figure 8:
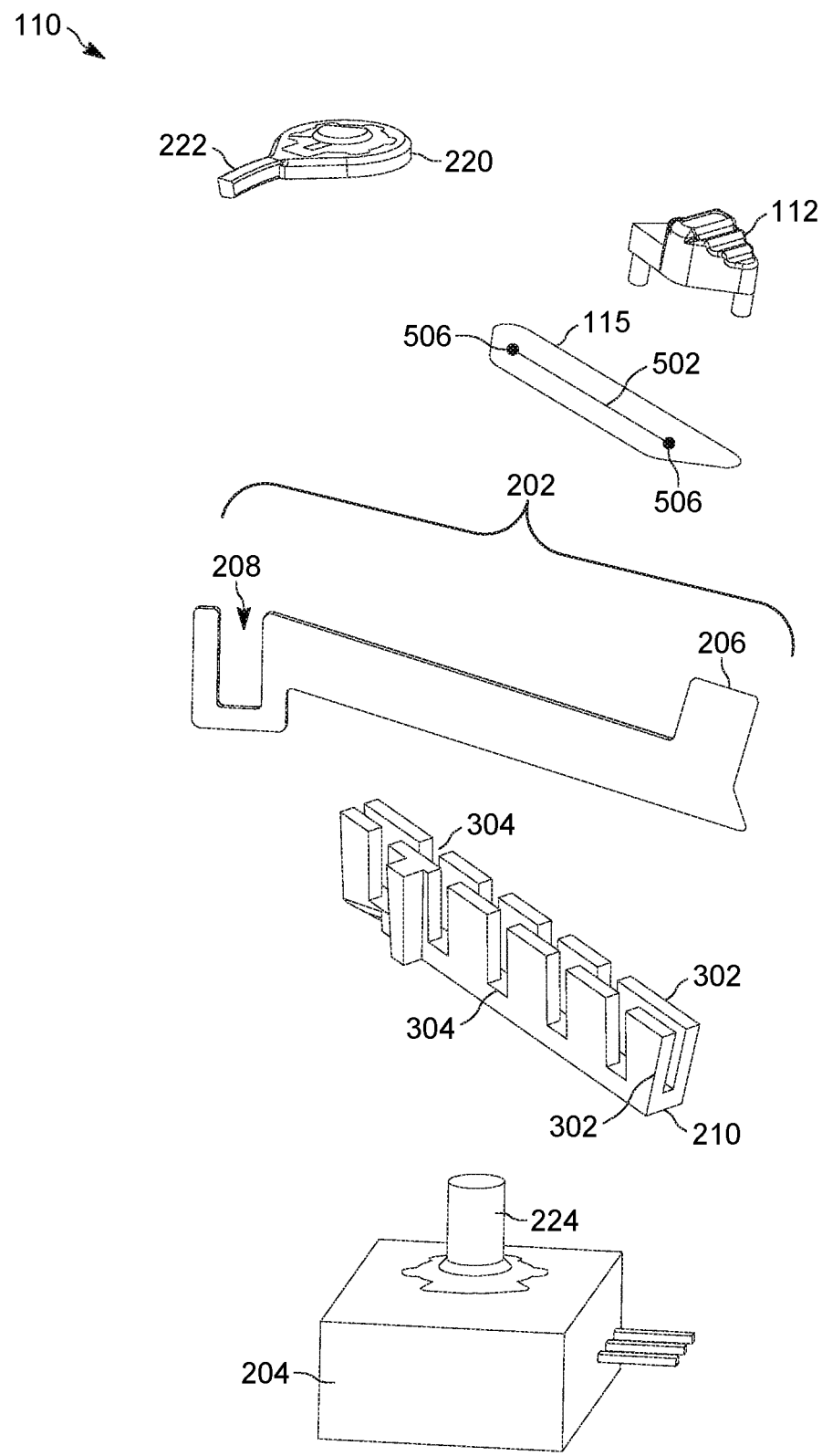
FIG. 8 is an exploded view of the individual components used for the control switch in accordance with some embodiments

FIG. 5 is a fourth cut-away view 500 of the radio control switch in accordance with some embodiments. Dust flap 115 covers the otherwise exposed track 210. An additional view of the dust flap 115 is also shown in FIG. 8. The dust flap 115 has a perforated tear line 504 formed therein and within which the connection tab 206 slides as the thumb button actuator slides. The dust flap 115 is preferably made of silicon or similar material which allows the perforated tear line 504 to open and close as the connection tab 206 is slid along the track 210. Hence, as the thumb button actuator 112 is actuated, the connection tab 206 coupled thereto locally displaces the perforated tear line 504 of the dust flap 115, thereby parting the perforated tear line 504 to the side only in the immediate vicinity of the connection tab 206. The perforated tear line 504 advantageously enables a zero-gap perforation for the dust flap 115 which improves sealing. In accordance with some embodiments, the dust flap 115 may further comprise two termini 506 (shown in FIG. 8) at either end of the perforated tear line 504, all within the body of the dust flap 115 to produce a zero-width gap and minimize foldover. The two termini 506 further minimize the risk of over-tear associated with narrow tear line 504.

FIGS. 6A, 6B, 6C show a top view of the rotary lever 220 being rotated by the linear motion provided by transfer arm 202 in accordance with some embodiments. The rotary lever 220 with lever arm 222 extending therefrom is formed of metal piece part containing a plastic insert 602 for fitting tightly to the shaft 224 with zero backlash. The plastic insert 602 is preferably formed of a suitably hard plastic, with a D-shaped aperture 604 formed therein. The suitably hard plastic of insert 602 encased in the metal lever allows for very tight, press-fit coupling about the D-shaped, shaft 224. Such coupling improves ruggedness of the overall mechanism. The plastic insert 602 may further comprise a gap 606 for resolving tolerances when the piece part is press fit about the shaft 224. The rotary lever 220 having lever arm 222 extending therefrom is shown being rotated from position A at FIG. 6A, to position B at FIG. 6B, to position C at FIG. 6C. The retention slot 208 of transfer arm 202 retains the lever arm 222 extending from the rotary lever 220 as the transfer arm 202 moves in a linear, non-orthogonal motion. These views also show that the transfer arm retention slot 208 of the transfer arm 202 is formed sufficiently wider than the lever arm 222 of the rotary lever to allow for articulation of the lever arm within the retention slot thereby enabling horizontal rotary motion of the lever arm in the orthogonal plane.

FIGS. 7A, 7B, 7C show side views of the retention slot end 208 of the transfer arm 202 with lever arm 222 inserted therein in accordance with some embodiments. In accordance with the embodiments, the lever arm 222 stays in one plane while the transfer arm retention slot 208 moves linearly at an angle as it rotates the lever arm. Thus, at switch position, A the lever arm is retained at the base of the retention slot. As the thumb button actuator (seen in other views) is moved to position B, the retention slot 208 of transfer arm 202 moves linearly upward thereby positioning the lever arm 222 in the middle of the retention slot. As the thumb button actuator is moved to position C, the retention slot 208 moves linearly upward thereby positioning the lever arm 222 toward the top of the retention slot. The retention slot 208 is moving upward, while the lever arm 222 remains in the same plane (the horizontal orthogonal plane) while the lever arm is being rotated.

FIG. 8 is an exploded view of the individual components used for the radio control switch 110 in accordance with some embodiments. The radio control switch 110 comprises the control elements comprising thumb button actuator 112, dust flap 115 having perforated tear line 504, transfer arm 202 with connector tab 206 at an upper end and retention slot 208 at a lower end, and track 210 formed of side walls 302 with castellations 304 formed thereon. The control switch 110 further comprises rotational elements comprising rotary lever 220 with lever arm extending therefrom and plastic insert 602 formed therein, the plastic insert having D-shaped aperture 604 with gap 606 formed therein, and electrical rotary switch 204 with shaft 224 extending therefrom. The components assembled in accordance with the various embodiments previously described beneficially enable the radio control switch 110 to operate within a non-orthogonal control top of a portable radio communication device translating linear, non-orthogonal motion into rotational motion about an orthogonal axis.

Figure 9:
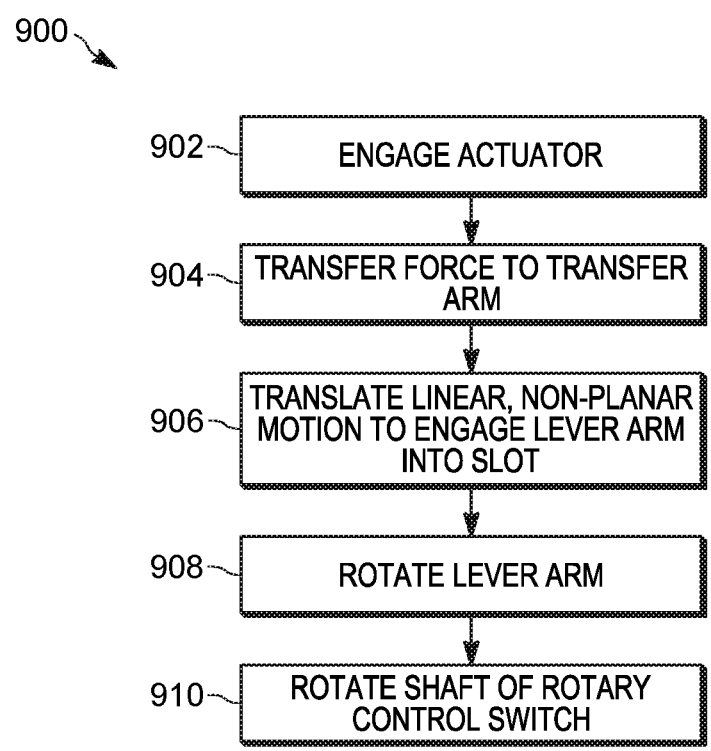
FIG. 9 is a flowchart of engagement steps for operating the control switch in accordance with some embodiments Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

FIG. 9 shows a flowchart 900 of the engagement steps for operating the control switch in accordance with some embodiments. Operation begins by engaging the actuator transfer arm at 902. Actuation can be accomplished, for example, by pressing and sliding the thumb button actuator 112 of FIG. 1 with a force. For example, the thumb button actuator 112 can be slid towards the back of the control top to selectively switch between zones C, B, and A. Alternatively, the thumb button actuator 112 can be slid from the back position of the control top to selectively switch between zones A, B, and C. Additional zone positions may be added to the configuration, depending on the application and space constraints. The force applied to the thumb button actuator 112 is transferred to the transfer arm at 904. The transfer arm moves in a linear, non-orthogonal motion corresponding to the non-orthogonal surface of the control top 102. The transfer arm translates, at 906, the linear, non-orthogonal motion which engages the rotary lever within the slot of the transfer arm. The rotary lever rotates and transfers the linear, non-orthogonal motion to the lever arm of the rotary control at 908 and the lever rotation translates the rotary motion about the shaft at 910 which in turn switches the electrical rotary switch thereby enabling a control function, such as zone selection, of the portable communication device. The electrical rotary switch is coupled to a controller (not shown) which has been programmed with the radio control function, such as selectable zones.

Accordingly, there has been provided an improved control switch which translates linear, non-orthogonal motion into rotational motion. The tight tolerance, ruggedness, and protection against dust, dirt, and debris make the control switch highly beneficial to public safety communication devices which operate in harsh environments. A radio control top incorporating the control switch of the embodiments enables an improved user interface by providing increased tactility, beneficial to first responders operating without visual cues and/or wearing gloves. The ability to integrate the components internally within the control top while allowing for separation from other user interface controls upon the external control top surface beneficially bridges the challenges of internal packaging with external ergonomic user interface.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A control switch, comprising:
an electrical rotary switch with a shaft extending therefrom, the shaft providing a primary axis of rotation;
a thumb button actuator providing a slide switch user interface;

an orthogonally-oriented rotary lever having a lever arm extending therefrom, the orthogonally-oriented rotary lever being orthogonal relative to the primary axis of rotation of the shaft;

a non-orthogonal transfer arm coupled between the thumb button actuator and the lever arm of the orthogonally-oriented rotary lever, the non-orthogonal transfer arm being non-orthogonal relative to the primary axis of rotation of the shaft; and the shaft being rotatable by the orthogonally-oriented rotary lever via linear, non-orthogonal motion transferred by the non-orthogonal transfer arm in response to a linear sliding actuation of the thumb button actuator.

2. The control switch of claim 1, wherein the non-orthogonal transfer arm is a single piece part having a connection tab at a first end and a retention slot at a second end, the connection tab and retention slot being formed as part of the single piece part, the connection tab being capped by the thumb button actuator and the retention slot for engaging the lever arm of the orthogonally-oriented rotary lever.

3. The control switch of claim 2, wherein the retention slot of the non-orthogonal transfer arm is formed sufficiently wider than the lever arm of the orthogonally-oriented rotary lever to allow for articulation of the lever arm within the retention slot at a plurality of different angles of rotation.

4. The control switch of claim 1, further comprising:

a track within which the non-orthogonal transfer arm slides.

5. The control switch of claim 4, wherein the non-orthogonal transfer arm comprises a plow feature for discharging debris.

6. The control switch of claim 4, wherein the track comprises castellations for discharging debris.

7. The control switch of claim 4, wherein the track is formed as a single piece part comprising first and second side walls and a bottom wall, the bottom wall of the track enabling the first and second side walls to fold tightly towards the non-orthogonal transfer arm.

8. The control switch of claim 1, further comprising:

a track having first and second opposing ends within which the non-orthogonal transfer arm slides; and a connection tab and retention slot formed at first and second ends of the non-orthogonal transfer arm, the connection tab and retention slot extending beyond the track.

9. The control switch of claim 8, further comprising:

a dust flap covering the track, the dust flap having a perforated tear line formed therein and though which the connection tab of the non-orthogonal transfer arm slides in response to the linear sliding actuation of the thumb button actuator.

10. The control switch of claim 9, wherein the perforated tear line of the dust flap opens and closes as the connection tab is slid along the track, thereby providing a zero-gap perforation for the dust flap.

11. The control switch of claim 9, wherein the dust flap further comprises two termini at either end the perforated tear line.

12. The control switch of claim 1, wherein the orthogonally-oriented rotary lever with lever arm extending therefrom is formed of a metal piece part containing a plastic insert, the plastic insert being press fit to the shaft with zero backlash.

13. The control switch of claim 12, further comprising:

a gap formed within the plastic insert of the orthogonally-oriented rotary lever for resolving tolerances about the shaft.

14. A portable communication device, comprising:

a housing;

an electrical rotary switch with a shaft extending therefrom located internal to the housing, the shaft providing a primary axis of rotation;

a non-orthogonal control top with a primary user interface surface coupled to the housing, the non-orthogonal control top being non-orthogonal relative to the primary axis of rotation of the shaft;

a plurality of user interface controls disposed on the non-orthogonal control top, at least one of the user interface controls comprising a thumb button actuator;

the electrical rotary switch being rotatable about the primary orthogonal axis of rotation via the shaft;

a rotary lever located internally to the non-orthogonal control top, the rotary lever being coupled to the shaft, the rotary lever having a lever arm extending therefrom; and a transfer arm coupled at a first end to the thumb button actuator and engaged at a second end to the rotary lever, the transfer arm providing non-orthogonal, linear motion with respect to the primary orthogonal axis of rotation of the electrical rotary switch in response to a linear sliding actuation of the thumb button actuator along the non-orthogonal control top.

15. The portable communication device of claim 14, further comprising:

a track located within the non-orthogonal control top, the track for receiving the transfer arm, the track comprising castellations; and a port formed in the housing and aligned with the track, the castellations of the track being configured to eject trapped debris out of track and through the port during the non-orthogonal, linear motion of the transfer arm in response to the linear sliding actuation of the thumb button actuator along the non-orthogonal control top.

16. The portable communication device of claim 14, wherein the transfer arm comprises:

a connection tab at the first end and a retention slot at the second end; and the connection tab being capped by the thumb button actuator, and the retention slot for engaging the lever arm extending from the rotary lever.

17. The portable communication device of claim 16, wherein the retention slot of the transfer arm is formed sufficiently wider than the lever arm of the rotary lever to allow for articulation of the lever arm within the retention slot thereby enabling horizontal rotary motion of the lever arm in an orthogonal plane.

18. The portable communication device of claim 16, wherein the thumb button actuator controls zone selection for the portable communication device.

19. A method of operating a radio control of a portable radio, comprising:

applying a force to linearly slide a thumb button actuator on a non-orthogonal surface of the portable radio, the non-orthogonal surface of the portable radio being non-orthogonal relative to a primary axis of rotation provided by a shaft of an internal electrical rotary control;

transferring the force applied to the thumb button actuator to a transfer arm, the transfer arm moving in a linear, non-orthogonal motion corresponding to the non-orthogonal surface;

engaging a lever arm of a rotary lever within a retention slot of the transfer arm, thereby translating the linear, non-orthogonal motion into rotary motion in an orthogonal plane, the orthogonal plane being orthogonal relative to the primary axis of rotation provided by the shaft;

transferring the rotary motion to the shaft of the electrical rotary control; and rotating the shaft of the electrical rotary control using the rotary motion to enable a control function of the portable radio.

20. The method of claim 19, further comprising:
pushing debris out of a port of the portable radio, via a plow feature of the transfer arm, in response to operating the radio control.

21. The method of claim 19, further comprising:
pushing debris out of another port of the portable radio, via the lever arm, in response to operating the radio control.

22. A portable communication device, comprising:

a housing;

an electrical rotary switch with a shaft extending therefrom located internal to the housing, the shaft providing a primary axis of rotation;

a plurality of user interface controls disposed on a control top of the housing, the control top being non-orthogonal relative to the shaft, and at least one of the user interface controls comprising a linearly slideable thumb button actuator;

a rotary lever located internally to the control top, the rotary lever being coupled to the shaft, the rotary lever having a lever arm extending therefrom; and a transfer arm coupled at a first end to the thumb button actuator and engaged at a second end to the rotary lever, the transfer arm providing non-orthogonal, linear motion with respect to the shaft in response to linearly sliding the thumb button actuator along the control top.

* * * * *